June 13, 1950  F. R. SCHMITT  2,511,826
DOUGH EXTRUSION DEVICE
Filed March 19, 1946  3 Sheets-Sheet 1

INVENTOR.
FRANK R. SCHMITT
BY Charles A. Morton
ATTORNEY.

June 13, 1950          F. R. SCHMITT          2,511,826
DOUGH EXTRUSION DEVICE
Filed March 19, 1946          3 Sheets-Sheet 3
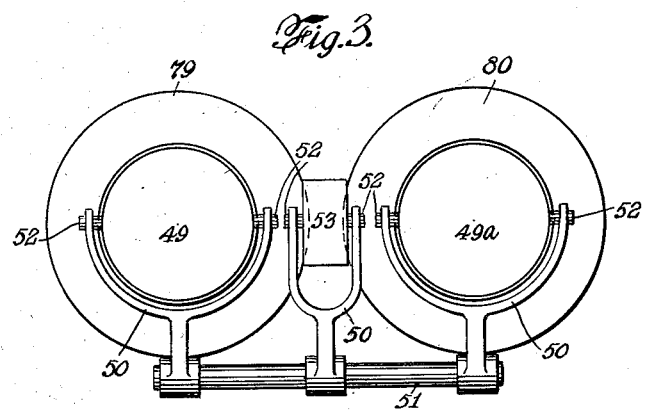
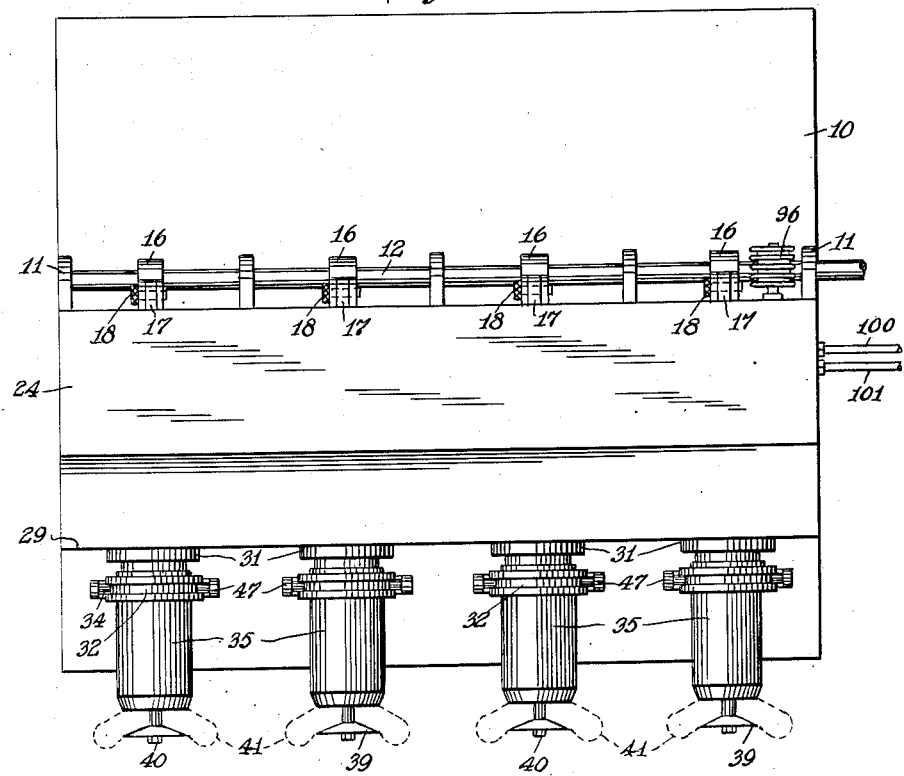
INVENTOR.
FRANK R. SCHMITT
BY Charles A. Morton
ATTORNEY Patented June 13, 1950

2,511,826

UNITED STATES PATENT OFFICE 2,511,826

DOUGH EXTRUSION DEVICE

Frank R. Schmitt, Queens Village, N. Y., assignor to Charles A. Morton, Baldwin, N. Y.

Application March 19, 1946, Serial No. 655,410

5 Claims. (Cl. 107—14)

This invention relates to improvements in extrusion devices generally, and particularly in extrusion devices of the die expressing type. It is especially adapted for use in the extrusion of plastic materials and more specifically for the extrusion of plastic formations of edible products such as raw doughnuts made from batter.

One object of this invention is to substantially eliminate agitation of the plastic material during its passage through the extrusion device, thereby reducing "working" of the plastic material to a minimum so as to avoid toughening of the finished product.

Another object is the substantial elimination of wastage of the plastic material.

Another object is an extrusion device which can be reloaded while the machine is in operation thus effecting continuous feeding thereof while in use.

Another object is a simple compact extrusion device which can be quickly dis-assembled, readily cleaned and rapidly re-assembled for further use.

Another object is an extrusion device which is positive in operation.

Another object is an extrusion device which can be quickly and effectively regulated at will, for positively instantaneously and accurately varying the size of the extrusions.

Another object is an extrusion device of rugged construction with but few and simple parts.

Another object is an extrusion device which utilizes standard parts ordinarily procurable upon the open market, thereby reducing the need for special parts.

Another object is an extrusion device which is pneumatically actuated thereby eliminating the need for drive shafts, gearing, and the like for inter-connecting said device with some external source of mechanical energy.

Other objects will appear from the detailed description which follows:

In accordance with this invention the plastic material is deposited in an open continuous feed hopper of the gravity type, said hopper including vacuum and compressed air chambers forming an integral part of the hopper casting, and is then progressed in measured units by means of a valve controlled mechanism of which said vacuum and compressed air chambers form a part towards a valved extrusion outlet which includes the conventional forming and cutting die for forming and severing annular (or other) formations of the extruded plastic, characterized in this, that the valve mechanisms are actuated by electro-magnetically controlled but pneumatically driven servo-motors whose cycle of operations is positively initiated and directed over suitable electrical circuits which are opened and closed in properly timed sequence.

In the drawings comprising three sheets of four figures numbered Figs. 1 to 4 inclusive:

Fig. 3 is an end view of one pair of solenoids, and certain associated parts; and Fig. 4 is a side elevation of the extrusion device.

Like reference characters designate corresponding parts throughout the several figures of the drawings.

Figure 1:
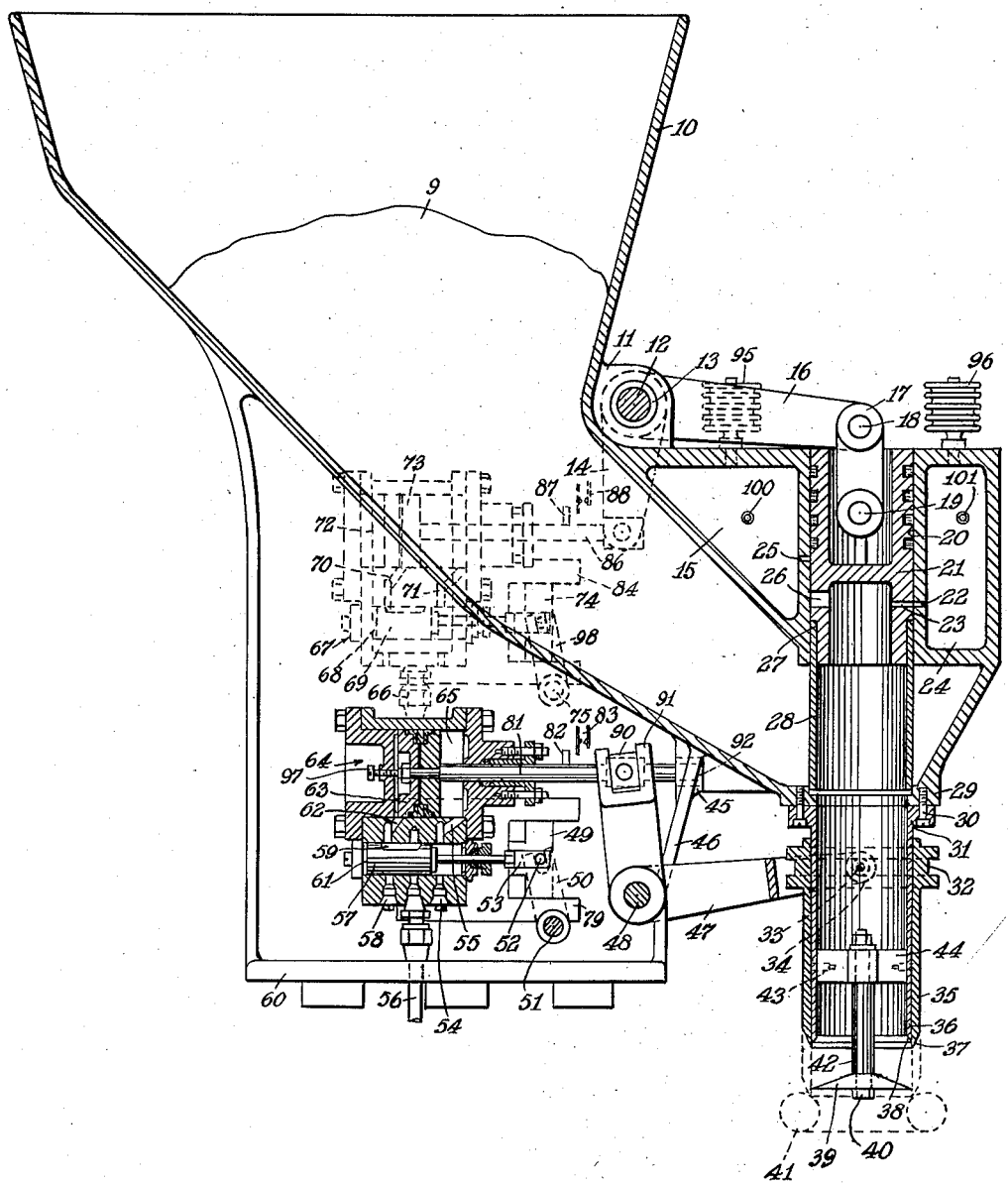
Fig. 1 is a vertical cross sectional view of the extrusion device showing certain of the parts partially broken away.

The hopper casting 10 preferably includes a hollow pedestal base 60, a common vacuum chamber 15, a common compressed air chamber 24, and one or more cylinders 20, all cast in one unit. The common hopper 10 which is of the gravity feed type, is provided with downwardly inclined tapering side walls terminating in one or more delivery throats each delivery throat forming a valve seat 29. The common chambers 15 and 24 connect with each of the cylinders 20. Each cylinder 20 has a piston valve 21 reciprocably mounted therein.

The common chambers 15 and 24 are pneumatically connected to any suitable exterior source of vacuum and compressed air supply (not shown) such as a pneumatic pump system or a vacuum-pressure pump, in such a manner that the pressure in the chamber 15 may be reduced below atmospheric pressure over the vacuum supply pipe 100, while the pressure in the chamber 24 is maintained substantially above atmospheric pressure over the compressed air supply pipe 101; so that the chamber 24 constitutes a compressed air chamber, and the chamber 15 may constitute a vacuum chamber.

The chamber 15 is provided with an air port 25 extending through the wall of the cylinder 20 and adapted to register with a control port 26 extending through the wall of piston valve 21. Similarly air chamber 24 is provided with a compressed air port 22 adapted to register with a control port 23 in the wall of the piston valve 21. To insure a proper seal between the wall of the piston valve 21 and the wall of the cylinder 20, the grooves formed in the head of piston valve 21 may either be filled with an edible grease, or may contain a series of piston rings.

The lower end of each piston valve 21 is reduced to form an annular shoulder and seat 27 for its associated sleeve valve 28 which abuts the shoulder and is secured upon the seat 27 in any preferred manner, as by a pressed fit. Each sleeve valve 28 intermittently engages the valve seat formed by the bore of its delivery throat 29 to interrupt the downward displacement of the plastic material 9 from the hopper 10 into the inner sleeve 36 of its associated forming and cutting die. In the position shown in Fig. 1 of the drawings a piston valve 21 has reached the lower limit of its downward movement and the sleeve valve 28 is seated against the valve seat formed by the bore of the delivery throat 29, thus momentarily sealing off all communication between the hopper 10 and inner sleeve 36. As the operating cycle continues piston valve 21 moves upwards in its cylinder 20 thus lifting sleeve valve 28 out of its seat in the bore of the delivery throat 29 to re-establish communication between hopper 10 and inner sleeve 36.

Each piston valve 21 is slidably actuated in its associated cylinder 20 in any suitable manner as by means of a removable link 17 which may be attached to piston valve 21 by a wrist pin 19 and to the piston oscillating lever 16 by a pin 18. The piston oscillating lever 16 is rockably supported by the common rocking shaft 12, which is journalled in the bracket bearing 11. A sleeve bushing 13 may be inserted in the hub of the lever arm 16. The lever arm 16 is rockably operated by the piston rod 86 of a servo-motor 67 in a manner hereinafter more fully described.

Each forming and cutting die mechanism (Figs 1 and 4) includes an inner sleeve 36 which is detachably attached to an exterior flange surrounding its associated delivery throat 29 in any preferred manner, as by means of a collar 31 drilled to receive suitable machine screws 30—30 which are threadably anchored in the hopper flange. An outer sleeve or sleeve cutter 35 is mounted for telescopic movement relative to each inner sleeve 36. The upper end of each sleeve cutter 35 terminates in a collar 32 having an annular groove formed therein for receiving the rollers 34—34 which are rotatably mounted upon the pins 33—33 of a forked rocker arm 47. The rocker arms 47 are keyed to a common rocking shaft 48, which is journalled in a bearing 46 of the bracket 45 which forms an integral part of the hopper casting 10. The rocking motion of the rocker arms 47 imparts axial sliding movement to their associated sleeve cutters 35. Each forming die 39 may be of any preferred shape dependent upon the desired contour of the plastic formation 41 to be extruded through the extrusion outlet between the forming die and the cutting die 36.

As illustrated the machine is designed to extrude annular formations of plastic material such as raw doughnuts made from batter, hence the forming die 39 as shown is a disc having a bevelled cutting edge. Each forming die 39 may be detachably mounted in spaced relation to the reversely bevelled lower edge 38 of its associated inner sleeve 36 in any preferred manner, as by means of a double-ended threaded die stem 42 and the lock nuts 40—40. The upper end of each die stem 42 is detachably supported in a spider 44 which may be detachably secured to the wall of its associated inner sleeve 36 in any suitable manner as by means of the grub screws 43—43. The lower edge of each inner sleeve 36 and of each sleeve cutter 35 are reversely bevelled and bevelled at 38 and 37 respectively, each bevel 37 providing a sharp cutting edge for severing each formation of plastic material 41. Each sleeve cutter 35 operates telescopically to intermittently close and re-open the extrusion outlet between the bevelled edge 38 of its associated sleeve 36 and the periphery of its associated forming die 39. At the lower limit of the telescopic action of each sleeve cutter 35, its bevelled cutting edge 37 projects beyond the periphery of its forming die 39, so that each forming die 39 enters within the opening of its sleeve cutter 35 with sufficient clearance to lubricate their interengaging surfaces and prevent any binding action therebetween.

The rocking motion of rocker arm 47 is effected by the piston rod 81 of the pneumatically driven piston 63 of servo-motor 64, the reciprocating motion of the piston rod 81 being translated into a rocking motion by means of the block 90 slidably nesting in the forked extremity of the lever arm 91 which is keyed to the common shaft 48 to which the rocker arms 47 are also keyed. Piston rod 81 is slidably journalled in a bearing 92 formed in the bracket 45 which forms an integral part of the hopper casting 10.

The servo-motor 64 which controls the operation of the sleeve cutters 35, and the servo-motor 67 which controls the operation of the piston valves 21 are constructed and function in the same general manner. The servo-motor 64 includes the solenoid windings 79 and 80 and their associated solenoid plungers 49 and 49a which are mounted for axial sliding movement in the fields of their respective solenoid windings, the direction of movement being dependent upon which solenoid winding 79 or 80, is electro-magnetically energized. The cores 49 and 49a and the piston rod 53 are provided with trunnions 52—52 nesting in the forked ends of the lever arms 50—50. The lever arms 50—50 are keyed to a common shaft 51, so that whenever either solenoid plunger 49 or 49a is drawn into its solenoid 79 or 80, as the case may be, its forked lever arm 50 follows the motion of the plunger and rocks the common shaft 51 to reciprocate piston rod 53 and its piston valve 57. Piston valve 57 reciprocates in its pneumatic cylinder 61 under control of the solenoids 79 and 80, in such a manner that when solenoid 79 is energized the piston valve 57 is driven into the cylinder 61 (Fig. 1) until the port 59 in piston valve 57 registers with connecting port 62 to supply compressed air from air pipe 56 to the head of the pneumatic plunger 63 while at the same time venting the cylinder compartment behind the pneumatic plunger 63 to atmosphere by way of connecting port 55 and exhaust port 54. The compressed air drives pneumatic plunger 63 to the opposite end of the cylinder 65, thus reciprocating piston rod 81 carrying sliding block 90 to actuate the forked extremity of the lever arm 91 which rocks the shaft 48 and the rocker arms 47 which in turn move the sleeve cutters 35 under the control of the rollers 34—34, to a position substantially as shown in dotted outline in Fig. 1 of the drawings. In this position the bevelled cutting edges 37 of sleeve cutters 35 move over and beyond the bevelled edges of the forming dies 39 to sever and release the plastic formations 41 extruded from the inner sleeves 36 over said forming dies. When the solenoid 80 is energized, the piston valve 57 is drawn to the opposite end of its cylinder 61 by the rocking movement of common shaft 51, and the front end of the pneumatic chamber 65 is vented to atmosphere by way of connecting port 62 and exhaust port 58. Port 59 of piston valve 57 now registers with connecting port 55 to supply compressed air from pipe 56 behind the pneumatic plunger 63 thus driving the pneumatic plunger into the cylinder 65 to a position substantially as shown in Fig. 1 of the drawings. Piston rod 81 now moves the lever arm 91 and rocking shaft 48 to rock the rocker arms 47 in the opposite direction thus returning each sleeve cutter 35 to the position substantially as shown in solid lines in Fig. 1 of the drawings. As the winding of each of the solenoids 79 and 80 are electro-magnetically energized and de-energized in succession, the piston valve 57 reciprocates back and forth under control of its forked lever 50 and the common rocking shaft 51 driven by the solenoid plungers 49 or 49a, thus alternately subjecting the opposite sides of the pneumatic plunger 63 to corresponding changes in pneumatic pressure to reciprocate the pneumatic plunger 63 and piston rod 81 back and forth, thus rocking rocker arms 47 to move the sleeve cutters 35 up and down in the manner previously described.

In like manner the piston valves 21 reciprocate in their respective cylinders 20 under control of the piston oscillating lever 16 driven by the pneumatic piston 73 of servo-motor 67 which is identical in construction and mode of operation to servo-motor 64 previously described. The solenoid plungers 74 and 74a of the solenoids 84 and 85 oscillate back and forth in tandem to rock, and rocked by, their common rocking shaft 75 and the forked lever arms 98—98. This moves piston or slide valve 69 to one end or the other of its cylinder 68, to connect compressed air pipe 66 with one of the connecting ports 70 or 71 dependent upon the position of slide valve 69, thus supplying compressed air to one side or the other of the pneumatic piston 73 to reciprocate piston rod 86 and rock piston oscillating lever arm 16 up and down to raise and lower each piston valve 21, thus intermittently interconnecting the hopper 10 with each delivery throat 29, to control the downward displacement of the plastic material from the hopper 10 into each inner sleeve 36 in the manner previously described.

The herein described extrusion machine is designed for use in conjunction with an apparatus of the conveyor type such as a doughnut frying machine for cooking doughnuts made from dough or batter. Doughnut frying machines of the conveyor type are well known. In such machines, the conveyor is quite generally driven by an electric motor or other prime-mover mechanically coupled to a conveyor shaft such as the conveyor shaft 93 (Fig. 2), which in this case is modified by the addition of one or more cams to form a timing shaft 93 which controls the movement of the contact switches 76, 77 and 78 which are mounted upon the timing shaft 93 in such a manner that the cam(s) closes the normally open contact switches 76, 77 and 78, in predetermined cyclic order.

The piston rod 81 of servo-motor 64 is furnished with a cam 82 for closing the contact switch 83 after the piston rod 81 moves off-normal. Similarly piston rod 86 of servo-motor 67 is provided with a control cam 87 for closing contact switch 88 after the piston rod 86 moves off-normal. All of the control circuits however, are ineffective until the manually operated main switch 89 is closed.

While for purposes of illustration, only one valve piston 21, sleeve valve 28, and forming and cutting die 39-35, has been shown in sectional detail, it should be understood that the hopper casting is usually provided, with two or more individual piston cylinders 20, piston valves 21, and sleeves 28, having access by means of additional vacuum, air, and control, ports, to the common vacuum chamber, and the common compressed air chamber, respectively, and with two or more extrusion outlets, each equipped with forming die 39 and a cutting die 35, as shown generally in Fig. 4 of the drawings. The servo-motor 67 and shaft 12 form a common control and drive mechanism for all of the valve pistons 21, and the servo-motor 64 and shaft 48 a common control and drive mechanism for all of the cutting dies 35.

The degree of vacuum, or pressure, is regulated in any suitable way as by means of automatic control devices 95 and 96. Many suitable types of control device are known to those skilled in the art but the "Mercoid" automatic control device manufactured by the Mercoid Corporation of Chicago, Ill. may be used with satisfactory results.

By regulating the degree of pressure of the compressed air in compressed air chamber 24, and the throw of the pneumatic piston 63 controlled by set screw 97 the weight of the plastic formation 41 may be accurately regulated. When the plastic formation 41 is a raw doughnut it is accordingly possible to regulate the weight of the ultimate product to produce any selected size of conventional doughnut.

The compressed air which escapes from the various exhaust ports, such as the exhaust ports 54 and 58, impinges against the wall of the hopper 10 and expands, thus absorbing heat from the wall of the hopper and from the air in the region of the hopper. This tends to keep the hopper cool.

*Principle of operation*

When main switch 89 is closed, a source of current supply 94 is connected to the line side of each of the solenoid windings 79, 80, 84 and 85. During the last phase of the cycle of operations, solenoid 79 was energized to cause the piston rod 81 to move out of its cylinder 65 thereby telescoping each sleeve cutter 35 over its associated forming die 39, into a position substantially as shown by the dot-and-dash line in Fig. 1 of the drawings, to sever and release the formations of plastic material 41. As the piston rod 81 of servo-motor 64 reaches the end of its outward stroke, the projection 82 on the piston rod 81 closes contact switch 83 to complete an electrical circuit for energizing the solenoid winding 84 of servo-motor 67 to initiate the next operating cycle. Solenoid 84 is electro-magnetically energized thus actuating solenoid plunger 74 to rock the common rocking shaft 75 and drive piston 69 into its associated cylinder 68 substantially as shown in Fig. 1 of the drawings, thus supplying compressed air from compressed air supply pipe 66 through connecting port 70 to the front compartment of pneumatic cylinder 72 to drive pneumatic piston 73 to the opposite end of the cylinder. Piston 73 drives piston rod 86 outwards to rock piston oscillating lever 16, which causes each piston valve 21 and its associated parts to rise in its associated cylinder 20 and seal off its individual compressed air port 22. As each piston valve 21 approaches the limit of its upward movement in its cylinder 22, each control port 26 registers with its associated vacuum port 25 to quickly reduce the pressure within its sleeve valve 28 below the atmospheric pressure applied to the head of plastic material 9 contained in the common hopper 10. The effect of gravity, supplemented where the consistency of the dough makes it necessary by this difference in pneumatic pressure, forces the plastic material 9 downwards into delivery throat 29 and the inner sleeve 36.

As the cycle of operations continues the cam 102 of the timing shaft 93 closes contact switch 77 to complete the electrical circuit for energizing the solenoid winding 85, thus actuating its associated solenoid plunger to rock the common rocking shaft 75 and retract piston valve 69. This supplies compressed air through connecting port 71 into the compartment of pneumatic cylinder 72 disposed behind the pneumatic piston 73, to drive piston 73 and piston rod 86 into the cylinder 72 to a position substantially as shown in dotted lines in Fig. 1. As piston rod 86 nears the end of its stroke, the projection 87 on piston rod 86 closes contact switch 88 to partially close an electrical circuit for energizing the winding of solenoid 89. The movement of piston rod 86 also initiates the downward stroke of each piston valve 21 and sleeve valve 28 in the associated cylinder 20, thus first sealing off each vacuum port 25, and thereafter seating each sleeve valve 28 in its associated delivery throat 29 to seal off any communication between the common hopper 10 and the corresponding inner sleeve 36.

Cam 102 of timing shaft 93 now closes contact switch 76 to complete the electrical circuit for energizing the solenoid 80. Solenoid 80 energized actuates solenoid plunger 49a to rock the common shaft 51 and draw piston valve 57 to the right hand end of its cylinder 61 thus exhausting that compartment of the cylinder 65 disposed in front of pneumatic piston 63 through connecting port 62 and exhaust port 58 to atmosphere, and supplying compressed air from compressed air supply pipe 56 through connecting port 55 into that compartment of cylinder 65 disposed behind pneumatic piston 63, to drive pneumatic piston 63 and its piston rod 81 into the cylinder 65 to a position substantially as shown in Fig. 1 of the drawings. As piston rod 81 moves it opens contact switch 3 to de-energize solenoid winding 84 of servo-motor 67, and rocks the rocker arm 47 in such a direction as to cause each sleeve cutter 35 to rise and uncover its associated forming die 39. At the completion of the downward stroke of each piston valve 21 its associated control port 23 registers with its compressed air port 22 to build up pressure above the column of plastic material trapped in the chamber formed by its inner sleeve 36 and its sleeve valve 28 in conjunction substantially above the atmospheric pressure of the extrusion outlet which was formed when the sleeve cutter 35 uncovered its associated forming die 39. As the pressure in sleeve valve 28 rises above atmospheric pressure the column of plastic material in each sleeve valve 36 moves downwards and is expelled through the lower end of its inner sleeve 36 and is extruded as a plastic formation 41 over its associated forming die 39. (Figs. 1 and 4.)

The continued rotation of timing shaft 93 in a counter-clockwise direction causes cam 102 to close contact switch 78 and establish an electrical circuit to energize solenoid winding 79 of servo-motor 64. Solenoid 79 energized moves solenoid plunger 49 to rock common shaft 51 in such a direction as to drive piston valve 57 into its cylinder 61 thus exhausting air from that compartment of cylinder 65 disposed behind pneumatic piston 63 by way of connecting port 55 and exhaust port 54 to atmosphere, and supplying compressed air from compressed air supply pipe 56 by way of piston port 59 and connecting port 62 to that compartment of cylinder 65 disposed in front of pneumatic piston 63, thus driving piston 63 to the opposite end of its cylinder 65. This imparts rocking motion to rocker arm 47 and causes each of the sleeve cutters 35 to telescope and descend over and beyond the bevelled edge of its associated forming die 39 to a position substantially as shown by the dot-and-dash lines in Fig. 1, thus severing each of the formations of plastic material 41 which are released.

As piston rod 81 approaches the end of its stroke, the projection 82 again closes contact switch 83 to reestablish the electrical circuit for energizing solenoid winding 84 of servo-motor 67, and the cycle of operation is repeated.

Figure 2:
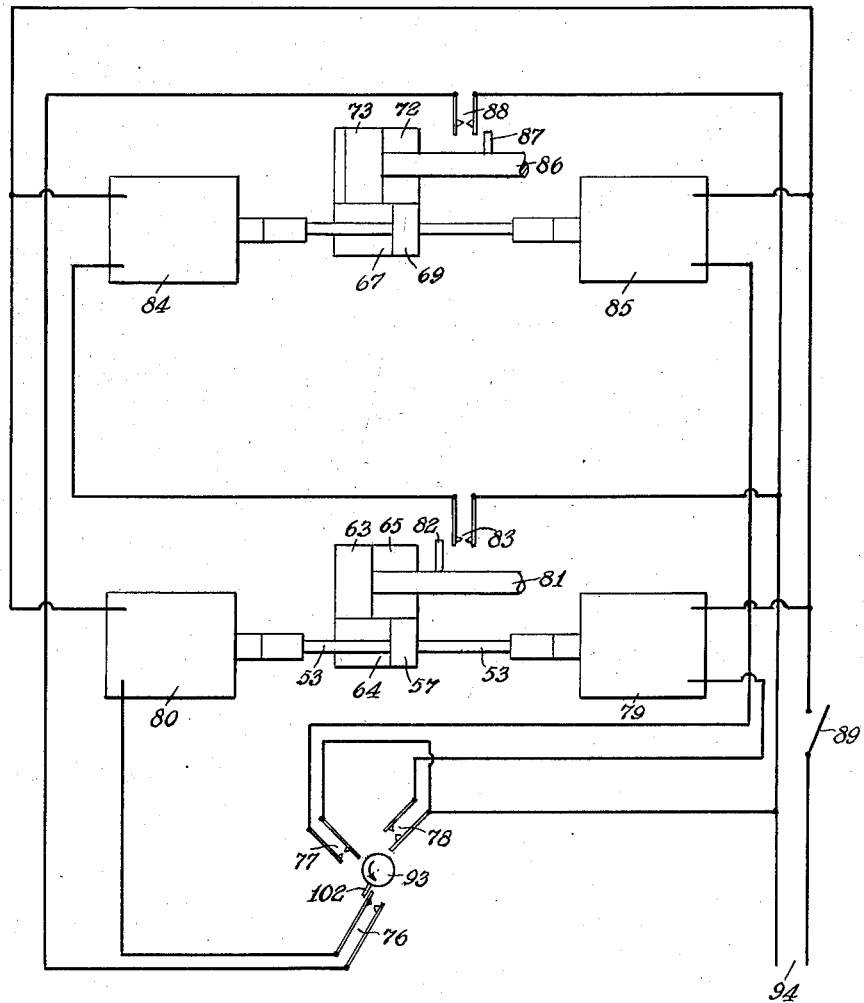
Fig. 2 is a schematic wiring diagram of the electrical control circuits.

If for any reason contact switch 88 fails to close at the end of the downward stroke of the sleeve valve 28, the operating circuit for solenoid 80 would not be completed when contact switch 76 is closed, hence piston 57 would not move from the position shown in Fig. 1 to that shown in Fig. 2, hence pneumatic piston 63 would not move to the position shown in Fig. 1, and the sleeve cutters 35 would remain closed and no plastic material would be extruded. This would indicate that either the mechanism or the circuit controlled by servo-motor 67, was not functioning correctly. Similarly if contact switch 83 fails to close for any reason the solenoid 84 will not be energized and the sleeve valve 28 will not rise to admit a new charge of plastic material 9 into the inner sleeve 36.

The effective closure of the contact switches 88 and 83 when the sleeve valves 28 and the sleeve cutters 35 are moved down is essential to the uninterrupted normal cyclic operation of the machine.

What is claimed is:

1. In an extrusion machine a gravity feed hopper for plastic material, a plurality of chambers supported by said hopper, said chambers including a vacuum chamber and a compressed air chamber; an exit passageway extending from the bottom of said hopper through which the plastic material is caused to be progressed to extrusion, said passageway connecting with each of said chambers, means associated with the passageway exit for periodically forming a plastic extrusion and for closing said exit to release the extrusion so formed, and a valve slidably operable in the passageway to alternately connect the vacuum chamber with the bottom of the feed hopper to draw a charge of plastic material from the feed hopper into the passageway and then seal off the feed hopper from the passageway and connect the compressed air chamber with the passageway to move said charge of plastic material towards the passageway exit.

2. In an extrusion machine a gravity feed hopper for plastic material, a vacuum chamber, a compressed air chamber, an exit passageway extending from the lower end of said hopper through which the plastic material is caused to be progressed to extrusion, each of said chambers having a port for connecting with said passageway, means associated with the passageway exit for periodically forming a plastic extrusion and then closing said exit to release the extrusion so formed, and a slide valve reciprocably operable in the passageway to uncover one of said ports to reduce the pressure at the lower end of the feed hopper below atmospheric to draw a charge of plastic material from the feed hopper into the passageway and then sealing off the lower end of the hopper and uncovering the other port to apply compressed air to the passageway to move said charge of plastic material towards the exit.

3. In an extrusion machine a gravity feed hopper for plastic material, an exit passageway connecting with the bottom of said hopper through which the plastic material is caused to be progressed to extrusion, a source of pressure below atmospheric, a source of compressed air, each of said sources having a separate ported opening connecting with said passageway, forming and cutting die mechanism mounted at the exit of the passageway said die mechanism being operable to form a plastic extrusion and to close said exit to sever and release said extrusion, and mounted in said passageway to alternately uncover one of said ported openings to reduce the pressure at the bottom of the hopper below atmospheric to displace a charge of the plastic material from the feed hopper into the passageway and then to seal off the feed hopper from the passageway and uncover the other ported opening to raise the pressure in the passageway substantially above atmospheric to move said charge towards the forming and cutting die.

4. In a self-contained extrusion machine unit and in combination a feed hopper for plastic material, a pedestal for supporting said hopper, said hopper and pedestal being fabricated in one self-contained unit, said pedestal being hollow, the lower wall of said hopper and the side walls of said pedestal in conjunction forming a housing, said hopper having a throated passage at its lower end, an extrusion outlet including a forming and cutting die merging with and in continuation of said throated passage, a chamber for compressed air having a port opening into said throated passage, a sleeve valve slidably operable in the throated passage from closed to open position and back again, said sleeve valve when in closed position sealing off the hopper and uncovering the port to permit compressed air to enter said throated passage and extrude a quantity of plastic material over the forming die, said sleeve valve when in open position sealing off the compressed air chamber and effecting the release of the compressed air from the throated passage to permit the movement of plastic material from said hopper into said extrusion outlet, electro-pneumatic servo-motors mounted within and protected by said housing, a plurality of rocker arms rockably supported upon the structure of the self-contained unit, and said rocker arms being mechanically coupled to and rockable by said servo-motors to operate said sleeve valve and said cutting die in predetermined cyclic order to complete the self-contained extrusion machine unit.

5. In a self-contained extrusion machine unit and in combination a feed hopper having a throated passage, an air chamber having a port extending through the wall thereof into said throated passage, and a hollow pedestal for supporting said hopper said throated passage and said air chamber, said feed hopper, throated passage, air chamber and hollow pedestal all being cast in one unit, the lower wall of the feed hopper and the side walls of the pedestal in conjunction forming a chambered housing disposed beneath said feed hopper, said air chamber being suppliable with air at a pressure above atmospheric, an extrusion outlet including a forming and cutting die merging with and in continuation of said throated passage, a sleeve valve slidably operable in the throated passage from closed to open position and back again, said sleeve valve when in closed position sealing off the hopper and uncovering the port to allow air under pressure to enter said throated passage from said air chamber and extrude a quantity of plastic material over the forming die, said sleeve valve when in open position sealing off the air chamber and effecting the discharge of the compressed air from the throated passage and the subsequent movement of plastic material from said hopper into said extrusion outlet, electro-pneumatic servo-motors mounted within and protected by said chambered housing, a plurality of rocker arms rockably supported upon the structure of the unit casting, and said rocker arms being mechanically coupled to and rockable by said serve-motors to operate said sleeve valve and said cutting die in properly timed sequence to complete said self-contained extrusion machine unit.

FRANK R. SCHMITT.

REFERENCES CITED

The following references are of record in the file of this patent:

UNITED STATES PATENTS

| Number | Name | Date |
|---|---|---|
| 585,179 | Bloemeck | June 29, 1897 |
| 1,025,559 | Bliss | May 7, 1912 |
| 1,306,966 | Marcoux et al. | June 17, 1919 |
| 1,856,042 | Mosher | Apr. 26, 1932 |
| 1,899,362 | Stratton | Feb. 28, 1933 |
| 2,166,260 | Mosher | July 18, 1939 |
| 2,246,758 | Roth | June 24, 1941 |
| 2,273,595 | Roth | Feb. 17, 1942 |
| 2,317,897 | Ellis | Apr. 27, 1943 |
| 2,339,291 | Paulus et al. | Jan. 18, 1944 |
| 2,397,351 | Heintz et al. | Mar. 26, 1946 |

Certificate of Correction

Patent No. 2,511,826 — June 13, 1950

FRANK R. SCHMITT

It is hereby certified that errors appear in the printed specification of the above numbered patent requiring correction as follows:

Column 7, line 49, for "switch 3" read *switch 83*; column 9, line 20, after the word "passageway" insert a comma; line 23, before "mounted" insert *a reciprocating valve*; column 10, line 38, for "serve-motors" read *servo-motors*; and that the said Letters Patent should be read with these corrections therein that the same may conform to the record of the case in the Patent Office.

Signed and sealed this 19th day of September, A. D. 1950.

[SEAL]

THOMAS F. MURPHY,
*Assistant Commissioner of Patents.*